United States Patent
Lin

(10) Patent No.: US 10,999,800 B2
(45) Date of Patent: May 4, 2021

(54) METHOD AND DEVICE FOR DISCONTINUOUS RECEPTION

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 31 days.

(21) Appl. No.: 16/463,741

(22) PCT Filed: Dec. 1, 2016

(86) PCT No.: PCT/CN2016/108264
§ 371 (c)(1),
(2) Date: May 23, 2019

(87) PCT Pub. No.: WO2018/098785
PCT Pub. Date: Jun. 7, 2018

(65) Prior Publication Data
US 2019/0327678 A1    Oct. 24, 2019

(51) Int. Cl.
| H04W 52/02 | (2009.01) |
| H04W 76/28 | (2018.01) |
| H04L 1/18 | (2006.01) |
| H04L 5/00 | (2006.01) |

(52) U.S. Cl.
CPC ....... H04W 52/0229 (2013.01); H04L 1/1819 (2013.01); H04L 5/0055 (2013.01); H04W 76/28 (2018.02)

(58) Field of Classification Search
CPC ............. H04W 52/0229; H04W 76/28; H04W 52/0216; H04L 1/1819; H04L 5/0055; Y02D 30/70
See application file for complete search history.

(56) References Cited

U.S. PATENT DOCUMENTS

| 1,664,327 | A | * | 3/1928 | Smith | .................... D03D 39/00 139/41 |
| 2008/0248840 | A1 | * | 10/2008 | Kim | .................. H04W 52/0216 455/574 |
| 2010/0144299 | A1 | * | 6/2010 | Ren | .................... H04W 52/0206 455/226.1 |
| 2011/0026625 | A1 | * | 2/2011 | Susitaival | ......... H04W 52/0251 375/260 |

(Continued)

FOREIGN PATENT DOCUMENTS

| CN | 102014373 A | 4/2011 |
| CN | 102256321 A | 11/2011 |

(Continued)

OTHER PUBLICATIONS

Extended European search report issued in corresponding European application No. 16923085.1 dated Aug. 22, 2019.

(Continued)

*Primary Examiner* — Phirin Sam
*Assistant Examiner* — Faiyazkhan Ghafoerkhan

(57) ABSTRACT

A method and an apparatus for discontinuous reception are provided. The method includes: a terminal transmits uplink data to a network device at transmitting time; and the terminal switches between a Discontinuous Reception (DRX) dormant period and a DRX active period within a time period after the transmitting time. The terminal transmits uplink data and the terminal is triggered to carry out discontinuous reception within the time period after the transmitting time of transmitting the uplink data.

16 Claims, 5 Drawing Sheets

(56) References Cited

U.S. PATENT DOCUMENTS

| | | | | |
|---|---|---|---|---|
| 2012/0207069 A1* | 8/2012 | Xu | ............... | H04W 52/0222 370/311 |
| 2013/0045770 A1* | 2/2013 | Aschan | ............... | H04W 76/28 455/522 |
| 2013/0308511 A1* | 11/2013 | Ljung | ............... | H04W 52/0209 370/311 |
| 2015/0181571 A1* | 6/2015 | Park | ............... | H04W 76/28 370/252 |
| 2015/0359034 A1* | 12/2015 | Kim | ............... | H04W 24/10 370/328 |
| 2020/0068648 A1* | 2/2020 | Lin | ............... | H04W 76/28 |
| 2020/0269154 A1* | 8/2020 | Lantela | ............... | B01D 21/283 |

FOREIGN PATENT DOCUMENTS

| | | |
|---|---|---|
| CN | 103582087 A | 2/2014 |
| JP | 2010521917 A | 6/2010 |
| JP | 2016505233 A | 2/2016 |

OTHER PUBLICATIONS

SA WG2 Meeting #93; S2-123545 Sofia, Bulgaria—Oct. 8-12, 2012.

3rd Generation Partnership Project et al. 3GPPTS 36.321 V10.1.0. Medium Access Control (MAC) Protocol Specification (Release 10). Mar. 31, 2011 (Mar. 31, 2011), entire document.

Communication pursuant to Article 94(3) EPC for EP Application 16923085.1 dated Jul. 30, 2020.

3GPP TS 36.304 V13.0.0; 3rd Generation Partnership Project; Technical Specification Group Radio Access Network; Evolved Universal Terrestrial Radio Access (E-UTRA); User Equipment (UE) procedures in idle mode (Release 13); Sophia Antipolis; 2015; pp. 1-42.

3GPP TS 36.321 V13.0.0; 3rd Generation Partnership; Technical Specification Group Radio Access Network; Evolved Universal Terrestrial Radio Access (E-UTRA); Medium Access Control (MAC) protocol specification (Release 13); Sophia Antipolis: 2015; pp. 1-82.

Examination Report and English Translation for IN Application No. 201917025380 dated Oct. 28, 2020.

Communication pursuant to Article 94(3) EPC Examination for EP Application 16923085.1 dated Jan. 18, 2021.

Japan Office Action with English Translation for JP Application 2019528558 dated Jan. 3, 2021.

* cited by examiner

METHOD AND DEVICE FOR DISCONTINUOUS RECEPTION

CROSS-REFERENCE TO RELATED APPLICATION(S)

This application is a 371 application of International Application No. PCT/CN2016/108264, filed on Dec. 1, 2016, the entire disclosure of which is hereby incorporated by reference.

TECHNICAL FIELD

Implementations of the present disclosure relate to the field of communications, and more particularly, to a method and an apparatus for discontinuous reception.

BACKGROUND

The transmission of packet-based data streams is usually in bursts. There may be data transmission between a network device and a terminal for a period of time, but subsequently there may be no data transmission for a long period of time. When there is no data transmission, the terminal may reduce power consumption of the terminal by stopping receiving Physical Downlink Control Channel (PDCCH) so as to increase usage time of a battery of the terminal. Such a communication method between the terminal and the network device is the so-called Discontinuous Reception (DRX).

In the prior art, the DRX working mechanism adopts a combination of a DRX cycle and a timer, a base station maintains in a same DRX working mode as a terminal, and learns in real time whether the terminal is in an active period or a dormant period, so as to ensure that the network device sends data to the terminal when the terminal is in the active period (On Duration), while the network device does not send data to the terminal when the terminal is in the dormant period (Opportunity for DRX).

However, the DRX working mechanism in the prior art makes the time period when the terminal is in the active period and the time period when the terminal is in the dormant period relatively fixed, reducing the flexibility of the terminal to communicate with the network device by using the DRX working mechanism.

SUMMARY

Implementations of the disclosure provide a method and an apparatus for discontinuous reception.

In a first aspect, a method for discontinuous reception is provided, including: a terminal transmits uplink data to a network device at transmitting time; and the terminal switches between a Discontinuous Reception (DRX) dormant period and a DRX active period within a time period after the transmitting time.

In connection with the first aspect, in some implementations of the first aspect, the method further includes: the terminal determines a first DRX pattern, wherein the first DRX pattern is used for indicating a time period corresponding to the DRX dormant period and a time period corresponding to the DRX active period within the time period after the transmitting time; switching by the terminal between the DRX dormant period and the DRX active period within the time period after the transmitting time, includes: the terminal switches between the DRX dormant period and the DRX active period according to the first DRX pattern within the time period after the transmitting time.

In connection with the first aspect, in some implementations of the first aspect, determining by the terminal the first DRX pattern includes: the terminal receives first indication information sent by the network device, wherein the first indication information is used for indicating the first DRX pattern.

In connection with the first aspect, in some implementations of the first aspect, the method further includes: the terminal determines a duration of using the first DRX pattern; switching by the terminal between the DRX dormant period and the DRX active period according to the first DRX pattern within the time period after the transmitting time, includes: within the duration, the terminal switches between the DRX dormant period and the DRX active period according to the first DRX pattern, and the duration is the time period after the transmitting time.

In connection with the first aspect, in some implementations of the first aspect, the method further includes: after the duration, the terminal switches between the DRX dormant period and the DRX active period according to a second DRX pattern.

In connection with the first aspect, in some implementations of the first aspect, the method further includes: the terminal receives second indication information sent by the network device, and the second indication information is used for indicating that the terminal does not switch between the DRX dormant period and the DRX active period according to the first DRX pattern; and the terminal stops the switching between the DRX dormant period and the DRX active period according to the first DRX pattern.

In connection with the first aspect, in some implementations of the first aspect, before the terminal determines the first DRX pattern, the method further includes: the terminal switches between the DRX dormant period and the DRX active period according to the second DRX pattern.

In connection with the first aspect, in some implementations of the first aspect, the method further includes: the terminal receives third indication information sent by the network device, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

In connection with the first aspect, in some implementations of the first aspect, the time period corresponding to the DRX dormant period and/or the time period corresponding to the DRX active period is determined according to at least one of the following pieces of information: a service quality or service attribute corresponding to downlink data to be transmitted; time required for encoding uplink data and/or downlink data; time required for decoding uplink data and/or downlink data; transmission time required to transmit uplink data and/or downlink data.

In connection with the first aspect, in some implementations of the first aspect, switching by the terminal between the DRX dormant period and the DRX active period within the time period after the transmitting time, includes: the terminal receives ACK information of the uplink data sent by the network device within the DRX active period, within the time period after the transmitting time; and the terminal switches from the DRX active period to the DRX dormant period at time of receiving the ACK information.

In connection with the first aspect, in some implementations of the first aspect, the method further includes: the terminal receives NACK information of the uplink data sent by the network device within the DRX active period, within the time period after the transmitting time; and the terminal retransmits the uplink data to the network device.

In connection with the first aspect, in some implementations of the first aspect, the method further includes: the terminal transmits the uplink data to the network device when the terminal does not receive ACK information of the uplink data sent by the network device during the time period corresponding to the DRX active period within the time period after the transmitting time.

In connection with the first aspect, in some implementations of the first aspect, switching by the terminal between the DRX dormant period and the DRX active period within the time period after the transmitting time, includes: the terminal receives NACK information of the uplink data sent by the network device within the DRX active period, within the time period after the transmitting time; and the terminal switches from the DRX active period to the DRX dormant period at time of receiving the NACK information.

In connection with the first aspect, in some implementations of the first aspect, the time period after the transmitting time includes a first time period, starting time of the first time period is the transmitting time, and switching by the terminal between the DRX dormant period and the DRX active period within the time period after the transmitting time, includes: the terminal is in the DRX active period within the first time period; and the terminal switches from the DRX active period to the DRX dormant period after the first time period within the time period after the transmitting time.

In connection with the first aspect, in some implementations of the first aspect, the time period after the transmitting time includes a first time period, starting time of the first time period is the transmitting time, switching by the terminal between the DRX dormant period and the DRX active period within the time period after the transmitting time, includes: the terminal is in the DRX dormant period within the first time period; and the terminal switches from the DRX dormant period to the DRX active period after the first time period within the time period after the transmitting time.

In connection with the first aspect, in some implementations of the first aspect, the first time period is determined according to at least one of the following pieces of information: a service quality or service attribute corresponding to downlink data to be transmitted; time required for encoding uplink data and/or the downlink data; time required for decoding uplink data and/or downlink data; transmission time required to transmit uplink data and/or downlink data.

In a second aspect, a method for discontinuous reception is provided, including: a network device receives uplink data transmitted by a terminal at transmitting time; and the network device transmits downlink data to the terminal within a time period after the transmitting time and when the terminal is in a Discontinuous Reception (DRX) active period.

In connection with the second aspect, in some implementations of the second aspect, the method further includes: the network device determines a first DRX pattern, wherein the first DRX pattern is used for indicating a time period corresponding to the DRX dormant period and a time period corresponding to the DRX active period within the period after the transmitting time; transmitting by the network device downlink data to the terminal within the time period after the transmitting time, includes: the network device transmits the downlink data to the terminal within a corresponding time period when the terminal is in the DRX active period according to the first DRX pattern within the time period after the transmitting time.

In connection with the second aspect, in some implementations of the second aspect, the method further includes: the network device transmits first indication information to the terminal, wherein the first indication information is used for indicating the first DRX pattern.

In connection with the second aspect, in some implementations of the second aspect, the network device configures the first DRX pattern for the terminal according to the first DRX pattern and a second corresponding relationship, wherein the second corresponding relationship includes at least one of the following corresponding relationships: a corresponding relationship between a DRX pattern and a service quality or service attribute corresponding to downlink data to be transmitted, a corresponding relationship between a DRX pattern and time required for encoding uplink data and/or downlink data; a corresponding relationship between a DRX pattern and time required for decoding uplink data and/or downlink data; a corresponding relationship between a DRX pattern and transmission time required to transmit uplink data and/or downlink data.

In connection with the second aspect, in some implementations of the second aspect, the method further includes: the network device transmits a duration of using the first DRX pattern to the terminal; and transmitting by the network device the downlink data to the terminal within the corresponding time period when the terminal is in the DRX active period according to the first DRX pattern within the time period after the transmitting time, includes: within the duration, the network device transmits the downlink data to the terminal within the corresponding time period when the terminal is in the DRX active period according to the first DRX pattern, wherein the duration is the time period after the transmitting time.

In connection with the second aspect, in some implementations of the second aspect, the method further includes: the network device transmits second indication information to the terminal, wherein the second indication information is used for indicating that the terminal does not switch between the DRX dormant period and the DRX active period according to the first DRX pattern.

In connection with the second aspect, in some implementations of the second aspect, the method further includes: the network device determines that the terminal should no longer use the first DRX pattern according to the first DRX pattern and a first corresponding relationship, wherein the first corresponding relationship includes at least one of the following corresponding relationships: a corresponding relationship between a DRX pattern and a service quality or service attribute corresponding to downlink data to be transmitted, a corresponding relationship between a DRX pattern and time required for encoding uplink data and/or downlink data; a corresponding relationship between a DRX pattern and time required for decoding uplink data and/or downlink data; a corresponding relationship between a DRX pattern and transmission time required to transmit uplink data and/or downlink data.

In connection with the second aspect, in some implementations of the second aspect, the method further includes: the network device transmits third indication information to the terminal, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

In connection with the second aspect, in some implementations of the second aspect, the time period corresponding to the DRX dormant period and the time period corresponding to the DRX active period are determined according to at least one of the following pieces of information: a service quality or service attribute corresponding to downlink data to be transmitted; time required for encoding uplink data and/or the downlink data; time required for decoding uplink data and/or downlink data; transmission time required to transmit uplink data and/or downlink data.

In connection with the second aspect, in some implementations of the second aspect, transmitting by the network device downlink data to the terminal within the time period after the transmitting time, includes: the network device transmits ACK information of the uplink data to the terminal within the time period after the transmitting time and when the terminal is in the DRX active period, wherein the ACK information is carried in the downlink data.

In connection with the second aspect, in some implementations of the second aspect, transmitting by the network device downlink data to the terminal within the time period after the transmitting time, includes: the network device transmits NACK information of the uplink data to the terminal within the time period after the transmitting time and when the terminal is in the DRX active period; and the network device receives the uplink data sent by the terminal again.

In connection with the second aspect, in some implementations of the second aspect, transmitting by the network device downlink data to the terminal within the time period after the transmitting time, includes: the network device prepares to receive the uplink data transmitted by the terminal when the network device does not send ACK information of the uplink data to the terminal during the time period corresponding to the DRX active period within the time period after the transmitting time.

In connection with the second aspect, in some implementations of the second aspect, the time period after the transmitting time includes a first time period, starting time of the first time period is the transmitting time, and the terminal is in the DRX active period within the first time period, transmitting by the network device downlink data to the terminal within the time period after the transmitting time, includes: the network device transmits the downlink data to the terminal within the first time period.

In connection with the second aspect, in some implementations of the second aspect, the time period after the transmitting time includes a first time period, starting time of the first time period is the transmitting time, and the terminal is in the DRX dormant period within the first time period, transmitting by the network device downlink data to the terminal within the time period after the transmitting time, includes: the network device transmits the downlink data to the terminal within the time period after the transmitting time and after the first time period.

In connection with the second aspect, in some implementations of the second aspect, the first time period is determined according to at least one of the following pieces of information: a service quality or service attribute corresponding to downlink data to be transmitted; time required for encoding uplink data and/or downlink data; time required for decoding uplink data and/or downlink data; transmission time required to transmit uplink data and/or downlink data.

In a third aspect, an apparatus for discontinuous reception is provided, which includes modules for performing the method of the first aspect.

In a fourth aspect, an apparatus for discontinuous reception is provided, which includes modules for performing the method of the second aspect.

In a fifth aspect, an apparatus for discontinuous reception is provided, which includes a memory for storing programs, a transceiver, and a processor for executing the programs, and when executing the programs, the processor executes the method of the first aspect based on the transceiver.

In a sixth aspect, an apparatus for discontinuous reception is provided, which includes a memory for storing programs, a transceiver, and a processor for executing the programs, and when executing the programs, the processor executes the method of the second aspect based on the transceiver.

In a seventh aspect, a computer readable medium is provided, which stores program codes for execution, wherein the program codes include instructions for executing the method of the first aspect.

In an eighth aspect, a computer readable medium is provided, which stores program codes for execution, wherein the program codes include instructions for executing the method of the second aspect.

DETAILED DESCRIPTION

Hereinafter, technical solutions in the implementation of the present disclosure will be described with reference to the accompanying drawings.

Figure 1:
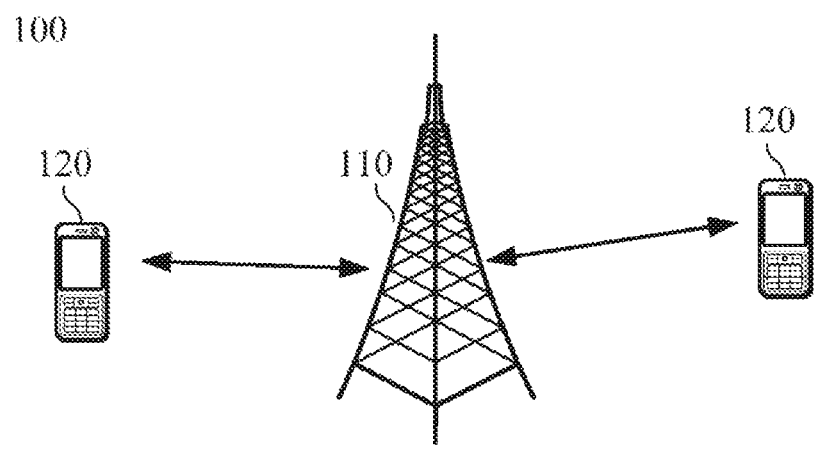
FIG. 1 shows a wireless communication system 100 to which an implementation of the present disclosure is applied.

FIG. 1 shows a wireless communication system 100 to which an implementation of the present disclosure is applied. The wireless communication system 100 may include a network device 110. The network device 110 may be a device that communicates with a terminal device. The network device 100 may provide communication coverage for a specific geographical area and may communicate with terminal devices located within the coverage area.

FIG. 1 exemplifies one network device and two terminals. Optionally, the wireless communication system 100 may include a plurality of network devices and other quantities of terminals may be included within the coverage area of each network device. Implementations of the present disclosure are not limited thereto.

Optionally, the wireless communication system 100 may include other network entities such as a network controller, and a mobile management entity. Implementations of the present disclosure are not limited thereto.

It should be understood that the technical solutions of the implementations of the present disclosure may be applied to various communication systems, such as a Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, Universal Mobile Telecommunication System (UMTS) system, New Radio Access Technology (NR), and 5G.

It should also be understood that in implementations of the present disclosure, terminal devices may include, but not limited to, a mobile station (MS), mobile terminal, mobile telephone, User Equipment (UE), handset, and portable equipment, etc. The terminal device may communicate with one or more core networks via a radio access network (RAN). For example, the terminal device may be a mobile phone (or called "cellular" phone) or a computer with wireless communication function. The terminal device may be a mobile apparatus that is portable, pocket-sized, hand-held, built in a computer, or mounted on a vehicle.

In implementations of the present disclosure, the network device may be an access network device, such as a base station, a Transmit and Receive Point (TRP), or an access point. The base station may be a Base Transceiver Station (BTS) in GSM or CDMA, a NodeB in WCDMA, an evolved Node B (eNB or e-NodeB) in LTE, or a NR or 5G base station (gNB), which is not restricted in the implementations of the present disclosure.

Figure 2:
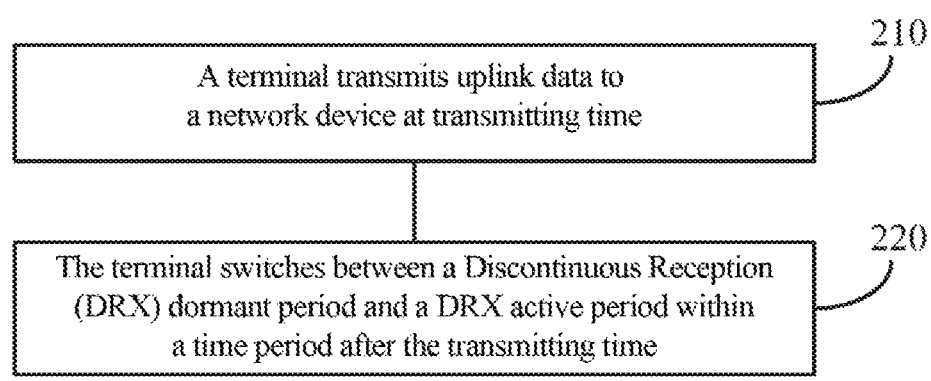
FIG. 2 shows a schematic flowchart of a method for discontinuous reception according to an implementation of the present disclosure.

FIG. 2 shows a schematic flowchart of a method for discontinuous reception according to an implementation of the present disclosure. The method shown in FIG. 2 includes acts 210 and 220.

In 210, a terminal transmits uplink data to a network device at transmitting time.

Specifically, the transmitting time may be specific time configured for the terminal by the network device or arbitrary time. When the terminal needs to transmit uplink data, the uplink data may be transmitted at any time, which is not restricted in the implementations of the present disclosure.

In 220, the terminal switches between a Discontinuous Reception (DRX) dormant period and a DRX active period within a time period after the transmitting time.

Specifically, when the terminal is in the DRX active period, it may turn on a receiving antenna, monitor PDCCH, and receive downlink control information through the PDCCH; when the terminal is in the DRX dormant period, it may not turn on the receiving antenna, and the network device may not send downlink data to the terminal when the terminal is in the DRX dormant period.

The terminal may be in a connected state, and in the DRX in the connected state, the terminal may monitor a user data channel.

The terminal transmits uplink data and the terminal is triggered to carry out discontinuous reception within the time period after the transmitting time of transmitting the uplink data, thus avoiding that the terminal must carry out discontinuous reception according to a DRX cycle at relatively fixed time in the prior art, and improving flexibility of the terminal to use the DRX working mechanism to communicate with the network device.

Optionally, as an implementation, the method further includes: the terminal determines a first DRX pattern for indicating a time period corresponding to the DRX dormant period and a time period corresponding to the DRX active period within the time period after the transmitting time; and switching by the terminal between the DRX dormant period and the DRX active period within the time period after the transmitting time further includes: the terminal switches between the DRX dormant period and the DRX active period according to the first DRX pattern within the time period after the transmitting time.

The terminal transmits uplink data and the terminal is triggered to carry out discontinuous reception according to the first DRX pattern within the time period after the transmitting time of transmitting the uplink data, thus improving the flexibility of the terminal to use the DRX working mechanism to communicate with the network device.

It should be noted that the first DRX pattern may be pre-configured for the terminal, or may be sent to the terminal by the network device. Implementations of the present disclosure do not restrict a specific manner by which the terminal determines the first DRX pattern.

Figure 3:
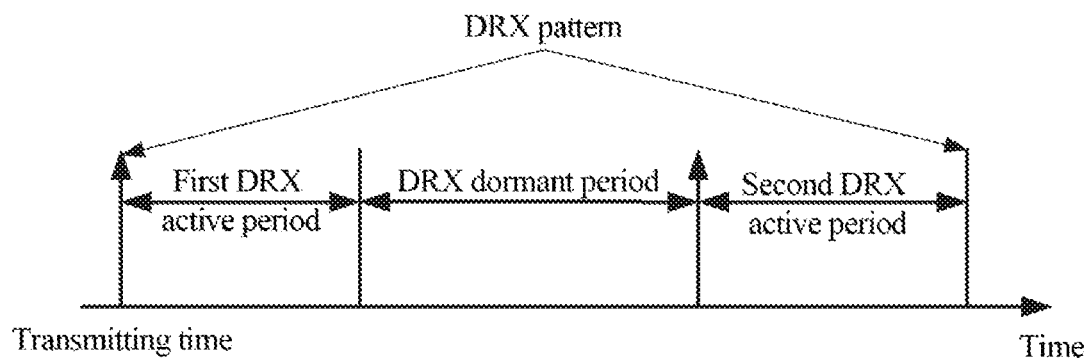
FIG. 3 shows a schematic diagram of a DRX pattern according to an implementation of the present disclosure.

FIG. 3 shows a schematic diagram of a DRX pattern according to an implementation of the present disclosure. As can be seen from the DRX transmission mechanism shown in FIG. 3, after the terminal sends uplink data to the network device at the transmitting time, the terminal is triggered to perform DRX transmission according to the DRX pattern. The terminal enters a first DRX active period, the terminal is in the DRX active period within a time period corresponding to the first DRX active period, and the terminal may receive feedback information sent by the network device in response to the uplink data sent at the transmitting time within the first DRX active period. After the end of the time period corresponding to the first DRX active period, the terminal enters a DRX dormant period until starting time of a second DRX active period indicated by the DRX pattern, and the terminal enters the second DRX active period.

Figure 4:
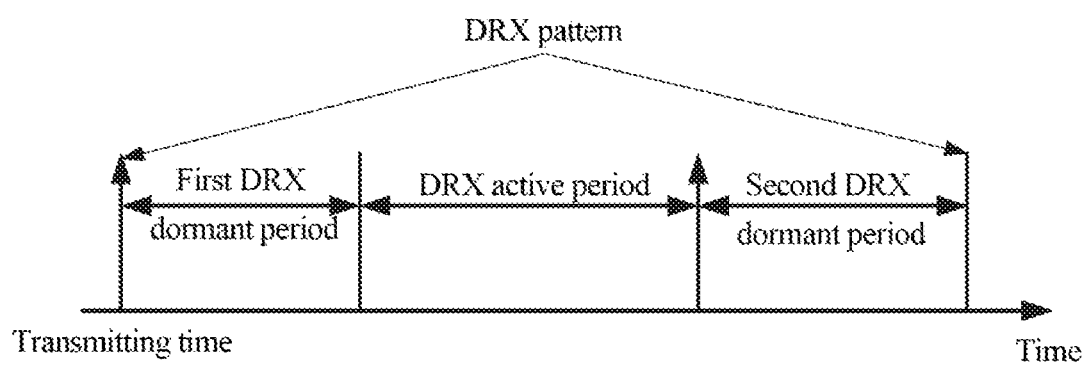
FIG. 4 shows a schematic diagram of a DRX pattern according to another implementation of the present disclosure.

For another example, FIG. 4 shows a schematic diagram of a DRX pattern according to another implementation of the present disclosure. As can be seen from the DRX transmission mechanism shown in FIG. 4, considering possible delay in the transmission of the uplink data by the terminal to the network device and time required for the network device to decode the uplink data, the network device will not send feedback information in response to the uplink data to the terminal immediately after the terminal sends the uplink data to the network device; so in order to further save power consumption of the terminal, the DRX pattern shown in FIG. 4 indicates that, after the terminal sends first uplink data to the network device at first transmitting time, the terminal may be triggered to enter a first DRX dormant period, and the terminal is in the DRX dormant period within a time period corresponding to the first DRX dormant period until starting time of an DRX active period indicated by the DRX pattern shown in FIG. 4, and the terminal enters the DRX active period. Within the DRX active period, the terminal may receive the feedback information sent by the network device in response to the first uplink data sent at the first transmitting time until starting time of a second DRX dormant period indicated by the DRX pattern shown in FIG. 4, and the terminal is triggered to enter the DRX dormant period again.

Optionally, as an implementation, determining by the terminal the first DRX pattern includes: the terminal determines the first DRX pattern from a DRX pattern set according to a service attribute, bearer type or HARQ process corresponding to downlink data to be transmitted. The DRX pattern set includes a plurality of DRX patterns, and different DRX patterns in the DRX pattern set correspond to different types of service attributes, bearer types or Hybrid Automatic Repeat Request (HARQ) processes.

It should be noted that the above DRX pattern set may be pre-configured for a terminal by a network device, or the DRX pattern set may be configured based on a communication protocol. Implementations of the present disclosure do not limit a specific manner in which the terminal obtains a DRX pattern.

Optionally, as an implementation, determining by the terminal the first DRX pattern includes: the terminal receives first indication information sent by the network device, wherein the first indication information is used for indicating the first DRX pattern.

It should be understood that the first indication information may be carried in a RRC signaling or MAC layer signaling, which is not restricted in implementations of the present disclosure.

Optionally, as an implementation, the method further includes: the terminal determines a duration of using the first DRX pattern; and switching by the terminal between the DRX dormant period and the DRX active period according to the first DRX pattern within the time period after the transmitting time, includes: within the duration, the terminal switches between the DRX dormant period and the DRX active period according to the first DRX pattern, wherein the duration is the time period after the transmitting time.

Specifically, the above duration may be any time period after the transmitting time when the terminal transmits the uplink data. For example, the starting time of the duration may be the transmitting time when the terminal transmits the uplink data, or the starting time of the duration may be any time period after the transmitting time when the terminal transmits the uplink data.

The network device transmits the first DRX pattern to the terminal and the terminal uses the duration of the first DRX pattern, such that the terminal carries out discontinuous reception according to the first DRX pattern within the duration, thus avoiding the terminal from carrying out discontinuous reception according to a fixed DRX cycle in the prior art and improving the flexibility of the terminal to use the DRX working mechanism to communicate with the network device.

Optionally, as an implementation, the method further includes: after the duration, the terminal switches between the DRX dormant period and the DRX active period according to a second DRX pattern.

Specifically, after the duration, the terminal may switch from the first DRX pattern to the second DRX pattern, and within a period of time, the terminal switches between DRX dormant period and DRX active period according to the second DRX pattern.

It should be understood that the second DRX pattern may be used to indicate a working mechanism of the DRX of the terminal based on a timer and a DRX cycle in the prior art, that is, the second DRX pattern may be used to indicate a corresponding time period when the terminal is in the dormant period and a corresponding time period when the terminal is in the active period within the DRX cycle, or the second DRX pattern may be used to indicate a corresponding time period when the terminal is in the dormant period and a corresponding time period when the terminal is in the active period within a period of time, which is not restricted in implementations of the present disclosure.

It should also be understood that the first DRX pattern and the second DRX pattern may be the same DRX pattern or may be different DRX patterns, which is not restricted in implementations of the present disclosure.

The network device may instruct the terminal to stop carrying out discontinuous reception according to the first DRX pattern through the second indication information at any time, thus improving the flexibility of the terminal to use the DRX working mechanism to communicate with the network device.

Optionally, as an implementation, the method further includes: the terminal receives second indication information sent by the network device, and the second indication information is used for indicating that the terminal does not switch between the DRX dormant period and the DRX active period according to the first DRX pattern.

Specifically, the terminal may always switch between the DRX dormant period and the DRX active period according to the first DRX pattern until the terminal receives the second indication information and no longer switches between the DRX dormant period and the DRX active period according to the first DRX pattern.

Optionally, as an implementation, before the terminal determines the first DRX pattern, the method further includes: the terminal switches between the DRX dormant period and the DRX active period according to the second DRX pattern.

Specifically, the terminal switches between the DRX dormant period and the DRX active period according to the second DRX pattern until the terminal determines the first DRX pattern, and the terminal may switch between the DRX dormant period and the DRX active period according to the first DRX pattern.

When the network device indicates the first DRX pattern to the terminal, it may also indicate to the terminal information of the service type to which the first DRX pattern is applicable, information of the bearer to which the first DRX pattern is applicable, information of the logical channel to which the first DRX pattern is applicable, and information of the HARQ process to which the first DRX pattern is applicable, so that the terminal may determine a corresponding DRX pattern as the first DRX pattern according to information of the service type to which the DRX pattern is applicable, information of the bearer to which the DRX pattern is applicable, information of the logical channel to which the DRX pattern is applicable, and information of the HARQ process to which the DRX pattern is applicable.

Optionally, as an implementation, the method further includes: the terminal receives third indication information sent by the network device, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

Specifically, the information of a bearer to which the first DRX pattern is applicable may include a bearer type and/or a bearer identification of the bearer to which the first DRX pattern is applicable; the information of a logical channel to which the first DRX pattern is applicable may include an identification of the logical channel to which the first DRX pattern is applicable; and the information of a HARQ process to which the first DRX pattern is applicable may include a process number of the HARQ process to which the first DRX pattern is applicable.

The time period corresponding to the DRX dormant period and/or the time period corresponding to the DRX active period in the DRX pattern are determined according to factors such as service requirements for transmission of a service between the network device and the terminal, encoding and decoding time required for transmission of data, such that the transmission requirements for service quality are also met while the power consumption of the terminal is reduced through the discontinuous reception.

The terminal may determine different DRX patterns for different data transmissions according to the information of the service type to which the first DRX pattern is applicable, the information of the bearer to which the first DRX pattern is applicable, the information of the logical channel to which the first DRX pattern is applicable, and the information of the HARQ process to which the first DRX pattern is applicable, so that requirements of data transmissions are met and power consumption of the terminal is further saved in the data transmission processes.

Optionally, as an implementation, the time period corresponding to the DRX dormant period and the time period corresponding to the DRX active period, indicated by the first DRX pattern within the time period after the transmitting time, are determined according to at least one of the following pieces of information: a service quality or service attribute corresponding to downlink data to be transmitted; encoding and decoding time of uplink data and/or downlink data; transmission time required to transmit uplink data and/or downlink data.

Optionally, as an implementation, switching by the terminal between the DRX dormant period and the DRX active period within the time period after the transmitting time, includes: the terminal receives Acknowledgement (ACK) information of the uplink data transmitted by the network device within the DRX active period within the time period after the transmitting time; and the terminal switches from the DRX active period to the DRX dormant period at the time of receiving the ACK information.

Specifically, the terminal in the DRX active period immediately switches from the DRX active period to the DRX dormant period upon receiving the ACK information of receiving the uplink data sent by network device.

Optionally, as an implementation, the time period after the transmitting time includes a first time period, starting time of the first time period is the transmitting time, and switching by the terminal between the DRX dormant period and the DRX active period within the time period after the transmitting time, includes: within the first time period, the terminal is in the DRX active period; and the terminal switches from the DRX active period to the DRX dormant period within the time period after the transmitting time and after the first time period.

Figure 5:
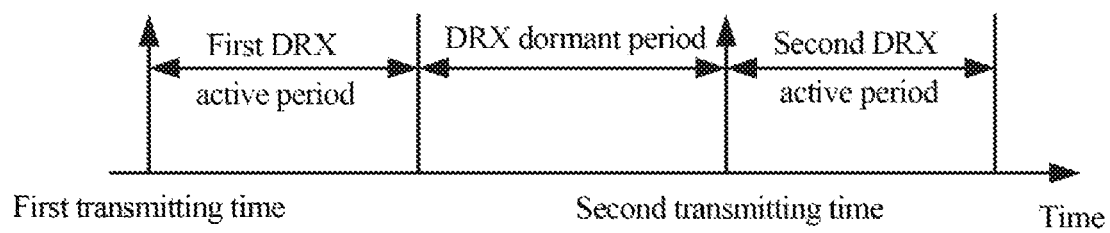
FIG. 5 shows a schematic diagram of DRX transmission performed by a terminal according to another implementation of the present disclosure.

For example, FIG. 5 shows a schematic diagram of DRX transmission performed by a terminal according to another implementation of the present disclosure. As can be seen from the DRX transmission mechanism shown in FIG. 5, the terminal sends first uplink data to the network device at first transmitting time. The terminal is triggered to enter first DRX active period, and the terminal is in the DRX active period within a time period corresponding to the first DRX active period, and the terminal may receive feedback information, in response to the first uplink data sent at the first transmitting time, sent by the network device within the first DRX active period. After the end of the time period corresponding to the first DRX active period, the terminal enters the DRX dormant period until the terminal has second uplink data to be sent and the terminal is triggered to enter the DRX active period again (see the second DRX active period in FIG. 5).

Optionally, as an implementation, switching by the terminal between the DRX dormant period and the DRX active period within the time period after the transmitting time, includes: within the time period after the transmitting time, the terminal does not receive ACK information of the uplink data sent by the network device during a time period corresponding to the DRX active period, and the terminal sends the uplink data to the network device.

Specifically, that the terminal does not receive ACK information of the uplink data sent by the network device within the whole time period corresponding to the DRX active period, may refer to that the terminal does not receive feedback information (e.g., ACK information or NACK information) in response to the uplink data sent by the network device within the whole time period corresponding to the DRX active period, and the terminal may retransmit the uplink data to the network device. Or, that the terminal does not receive ACK information of the uplink data sent by the network device within the whole time period corresponding to the DRX active period, may refer to that the terminal receives Negative Acknowledgement (NACK) information sent by the network device for the uplink data within the whole time period corresponding to the DRX active period, and the terminal may retransmit the uplink data to the network device.

Optionally, as an implementation, the time period after the transmitting time includes a first time period, starting time of the first time period is the transmitting time, and switching by the terminal between the DRX dormant period and the DRX active period within the time period after the transmitting time, includes: within the first time period, the terminal is in the DRX dormant period; and the terminal switches from the DRX dormant period to the DRX active period within the time period after the transmitting time and after the first time period.

Figure 6:
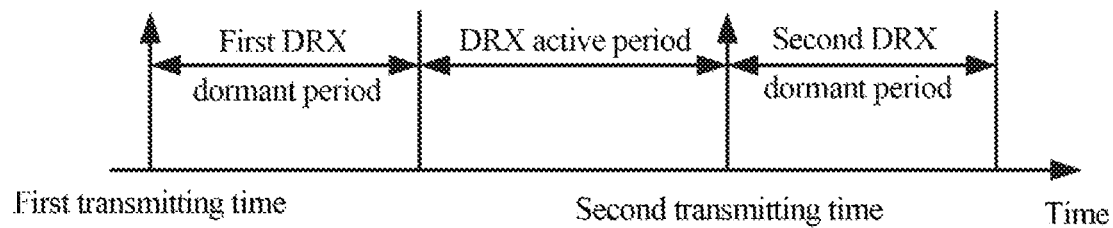
FIG. 6 shows a schematic diagram of a DRX pattern according to another implementation of the present disclosure.

For example, FIG. 6 shows a schematic diagram of a DRX pattern according to another implementation of the present disclosure. As can be seen from a DRX transmission mechanism shown in FIG. 6, considering possible delay in the transmission of uplink data by a terminal to a network device and time required for the network device to decode the uplink data, the network device will not send feedback information in response to the uplink data to the terminal immediately after the terminal sends the uplink data to the network device; so in order to further save power consumption of the terminal, after the terminal sends first uplink data to the network device at first transmitting time, the terminal may be triggered to enter a first DRX dormant period, and the terminal is in the DRX dormant period within a time period corresponding to the first DRX dormant period. The terminal enters an DRX active period after the end of the time period corresponding to the first DRX dormant period, and the terminal may receive feedback information, in response to the first uplink data sent at the first time, sent by the network device within the first DRX active period until the terminal has second uplink data to be sent, and the terminal is triggered to enter the DRX dormant period again (see the second DRX dormant period in FIG. 6).

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; transmission time required to transmit uplink data and/or downlink data.

Optionally, as an implementation, switching by the terminal between the DRX dormant period and the DRX active period within the time period after the transmitting time, includes: the terminal receives NACK information of the uplink data transmitted by the network device within the DRX active period within the time period after the transmitting time; and the terminal switches from the DRX active period to the DRX dormant period at the time of receiving the NACK information.

Specifically, when the terminal receives NACK information of the uplink data sent by the network device, the terminal may continue to send the uplink data to the network device, but considering factors such as time delay of uplink transmission, the network device may not send feedback information to the terminal within a period of time, and the terminal may enter the DRX dormant period to reduce the power consumption of the terminal.

Figure 7:
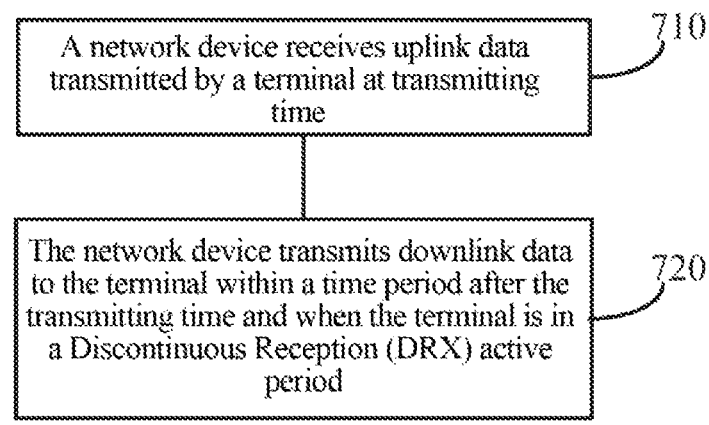
FIG. 7 shows a schematic flowchart of a method for discontinuous reception according to another implementation of the present disclosure.

FIG. 7 shows a schematic flowchart of a method for discontinuous reception according to another implementation of the present disclosure. The method shown in FIG. 7 includes acts 710 and 720.

710, a network device receives uplink data transmitted by a terminal at transmitting time.

720, the network device transmits downlink data to the terminal within a time period after the transmitting time and when the terminal is in a Discontinuous Reception (DRX) active period.

The terminal transmits uplink data and the terminal is triggered to carry out discontinuous reception within the time period after the transmitting time of transmitting the uplink data, thus avoiding that the terminal must carry out discontinuous reception according to a DRX cycle at relatively fixed time in the prior art, and improving flexibility of the terminal to use the DRX working mechanism to communicate with the network device.

Optionally, as an implementation, the method further includes: the network device determines a first DRX pattern for indicating a time period corresponding to the DRX dormant period and a time period corresponding to the DRX active period within the time period after the transmitting time; transmitting by the network device the downlink data to the terminal within the time period after the transmitting time further includes: the network device transmits the downlink data to the terminal within a corresponding time period when the terminal is in the DRX active period according to the first DRX pattern, within the time period after the transmitting time.

The terminal transmits uplink data and the terminal is triggered to carry out discontinuous reception according to the first DRX pattern within the time period after the transmitting time of transmitting the uplink data, thus improving the flexibility of the terminal to use the DRX working mechanism to communicate with the network device.

Optionally, as an implementation, the method further includes: the network device sends first indication information to the terminal, wherein the first indication information is used for indicating the first DRX pattern.

Optionally, as an implementation, the method further includes: the network device configures the first DRX pattern for the terminal according to the first DRX pattern and a second corresponding relationship, wherein the second corresponding relationship includes at least one of the following corresponding relationships: a corresponding relationship between a DRX pattern and a service quality or service attribute corresponding to downlink data to be transmitted, a corresponding relationship between a DRX pattern and time required for encoding uplink data and/or downlink data; a corresponding relationship between a DRX pattern and time required for decoding uplink data and/or downlink data; a corresponding relationship between a DRX pattern and transmission time required to transmit uplink data and/or downlink data.

Optionally, as an implementation, the method further includes: the network device transmits a duration of using the first DRX pattern to the terminal; and transmitting by the network device the downlink data to the terminal within the corresponding time period when the terminal is in the DRX active period according to the first DRX pattern, within the time period after the transmitting time, includes: within the duration, the network device transmits the downlink data to the terminal within the corresponding time period when the terminal is the DRX active period according to the first DRX pattern, wherein the duration is the time period after the transmitting time.

The network device transmits the first DRX pattern to the terminal and the terminal uses the duration of the first DRX pattern, such that the terminal carries out discontinuous reception according to the first DRX pattern within the duration, thus avoiding the terminal from carrying out discontinuous reception according to a fixed DRX cycle in the prior art and improving the flexibility of the terminal to use the DRX working mechanism to communicate with the network device.

Optionally, as an implementation, the method further includes: the network device transmits second indication information to the terminal, wherein the second indication information is used for indicating that the terminal does not switch between the DRX dormant period and the DRX active period according to the first DRX pattern.

The network device may instruct the terminal to stop carrying out discontinuous reception according to the first DRX pattern through the second indication information at any time, thus improving the flexibility of the terminal to use the DRX working mechanism to communicate with the network device.

Optionally, as an implementation, the method further includes: the network device determines that the terminal should no longer use the first DRX pattern according to the first DRX pattern and a first corresponding relationship, wherein the first corresponding relationship includes at least one of the following corresponding relationships: a corresponding relationship between a DRX pattern and a service quality or service attribute corresponding to downlink data to be transmitted, a corresponding relationship between a DRX pattern and time required for encoding uplink data and/or downlink data; a corresponding relationship between a DRX pattern and time required for decoding uplink data and/or downlink data; a corresponding relationship between a DRX pattern and transmission time required to transmit uplink data and/or downlink data.

Specifically, the network device may configure a DRX pattern for the terminal in real time according to a service type of a service corresponding to the downlink data to be transmitted; the network device may configure a DRX pattern for the terminal in real time according to the time required for encoding uplink data and/or downlink data; the network device may configure a DRX pattern for the terminal in real time according to the time required for decoding uplink data and/or downlink data; and the network device may configure a DRX pattern for the terminal in real time according to the DRX pattern and transmission time required for transmitting uplink data and/or downlink data.

Optionally, as an implementation, the method further includes: the network device transmits third indication information to the terminal, wherein the third indication information is used for indicating at least one of the following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

When the network device indicates the first DRX pattern to the terminal, it may also indicate to the terminal information of the service type to which the first DRX pattern is applicable, information of the bearer to which the first DRX pattern is applicable, information of the logical channel to which the first DRX pattern is applicable, and information of the HARQ process to which the first DRX pattern is applicable, so that the terminal may determine a corresponding DRX pattern as the first DRX pattern according to information of the service type to which the DRX pattern is applicable, information of the bearer to which the DRX pattern is applicable, information of the logical channel to which the DRX pattern is applicable, and information of the HARQ process to which the DRX pattern is applicable.

Optionally, as an implementation, the time period corresponding to the DRX dormant period and the time period corresponding to the DRX active period are determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

The time period corresponding to the DRX dormant period and/or the time period corresponding to the DRX active period in the DRX pattern are determined according to factors such as service requirements for transmission of a service between the network device and the terminal, encoding and decoding time required for transmission of data, such that the transmission requirements for service quality are also met while power consumption of the terminal is reduced through the discontinuous reception.

Optionally, as an implementation, transmitting by the network device the downlink data to the terminal within the time period after the transmitting time includes: the network device transmits ACK information of the uplink data to the terminal within the time period after the transmitting time and while the terminal is in the DRX active period, wherein the ACK information is carried in the downlink data.

Optionally, as an implementation, transmitting by the network device the downlink data to the terminal within the time period after the transmitting time includes: the network device transmits NACK information of the uplink data to the terminal within the time period after the transmission time and while the terminal is in the DRX active period; and the network device receives the uplink data sent by the terminal again.

Optionally, as an implementation, transmitting by the network device the downlink data to the terminal within the time period after the transmitting time includes: within the time period after the transmitting time, during a time period corresponding to the DRX active period, the network device does not transmit ACK information of the uplink data to the terminal, and the network device prepares to receive the uplink data transmitted by the terminal.

Optionally, as an implementation, the time period after the transmitting time includes a first time period, starting time of the first time period is the transmitting time, and the terminal is in the DRX active period within the first time period, and transmitting by the network device the downlink data to the terminal within the time period after the transmitting time includes: the network device transmits the downlink data to the terminal within the first time period.

Optionally, as an implementation, the time period after the transmitting time includes a first time period, starting time of the first time period is the transmitting time, and the terminal is in the DRX dormant period within the first time period, and transmitting by the network device the downlink data to the terminal within the time period after the transmitting time includes: within the time period after the transmitting time and after the first time period, the network device transmits the downlink data to the terminal.

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; transmission time required to transmit uplink data and/or downlink data.

The time length of the first time period is determined according to factors such as service requirements for transmission of a service between the network device and the terminal, encoding and decoding time required for transmission of data, such that transmission requirements for service quality are also met while power consumption of the terminal is reduced through discontinuous reception.

The method implementations of the present disclosure are described in detail above with reference to FIGS. 1 to 7, and the apparatus implementations of the present disclosure are described in detail below with reference to FIGS. 8 to 11. It should be understood that the apparatus implementations and the method implementations correspond to each other, and similar descriptions may refer to the method implementations.

Figure 8:
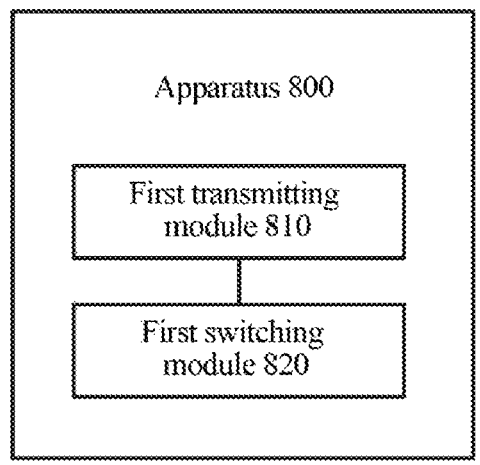
FIG. 8 shows a schematic block diagram of an apparatus for discontinuous reception according to an implementation of the present disclosure.

FIG. 8 shows a schematic block diagram of an apparatus for discontinuous reception according to an implementation of the present disclosure. The apparatus 800 shown in FIG. 8 includes a first transmitting module 810 and a first switching module 820.

The first transmitting module 810 is used for transmitting uplink data to a network device at transmitting time.

The first switching module 820 is used for switching between a Discontinuous Reception (DRX) dormant period and a DRX active period within a time period after the transmitting time.

Optionally, as an implementation, the apparatus further includes: a first determining module for determining a first DRX pattern for indicating a time period corresponding to the DRX dormant period and a time period corresponding to the DRX active period within the time period after the transmitting time; and the first switching module is further used for switching between the DRX dormant period and the DRX active period according to the first DRX pattern within the time period after the transmitting time.

Optionally, in an implementation, the first determining module is further used for receiving first indication information sent by the network device, wherein the first indication information is used for indicating the first DRX pattern.

Optionally, as an implementation, the apparatus further includes: a second determining module, used for determining a duration of using the first DRX pattern; and the first switching module is further used for switching between the DRX dormant period and the DRX active period according to the first DRX pattern within the duration, and the duration is the time period after the transmitting time.

Optionally, as an implementation, the apparatus further includes: a second switching module used for switching between the DRX dormant period and the DRX active period according to a second DRX pattern after the duration.

Optionally, as an implementation, the apparatus further includes: a first receiving module used for receiving second indication information sent by the network device, wherein the second indication information is used for indicating that the terminal does not switch between the DRX dormant period and the DRX active period according to the first DRX pattern.

Optionally, as an implementation, the apparatus further includes: a third determining module used for switching between the DRX dormant period and the DRX active period according to the second DRX pattern.

Optionally, as an implementation, the apparatus further include: a second receiving module used for receiving third indication information sent by the network device, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

Optionally, as an implementation, the time period corresponding to the DRX dormant period and/or the time period corresponding to the DRX active period are determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Optionally, as an implementation, the first switching module is specifically used for receiving ACK information of the uplink data sent by the network device within the DRX active period, within the time period after the transmitting time; and switching from the DRX active period to the DRX dormant period at time of receiving the ACK information.

Optionally, as an implementation, the apparatus further includes: a receiving module for receiving NACK information of the uplink data sent by the network device within the DRX active period, within the time period after the transmitting time; and a second transmitting module, used for transmitting the uplink data to the network device again.

Optionally, as an implementation, the first switching module is specifically used for receiving NACK information of the uplink data sent by the network device within the DRX active period, within the time period after the transmitting time; and switching from the DRX active period to the DRX dormant period at time of receiving the NACK information.

Optionally, as an implementation, the apparatus further includes: a third transmitting module used for transmitting the uplink data to the network device, when ACK information of the uplink data sent by the network device is not received during the time period corresponding to the DRX active period within the time period after the transmitting time.

Optionally, as an implementation, the time period after the transmitting time includes a first time period, starting time of the first time period is the transmitting time, and the first switching module is specifically used for: being in the DRX active period within the first time period; and switching from the DRX active period to the DRX dormant period within the time period after the transmitting time and after the first time period.

Optionally, as an implementation, the time period after the transmitting time includes a first time period, starting time of the first time period is the transmitting time, and the first switching module is specifically used for: being in the DRX dormant period within the first time period; and switching from the DRX dormant period to the DRX active period within the time period after the transmitting time and after the first time period.

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Figure 9:
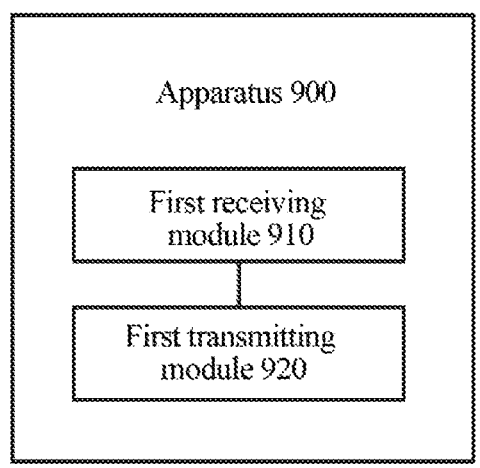
FIG. 9 shows a schematic block diagram of an apparatus for discontinuous reception according to another implementation of the present disclosure.

FIG. 9 shows a schematic block diagram of an apparatus for discontinuous reception according to another implementation of the present disclosure. The apparatus 900 shown in FIG. 9 includes a first receiving module 910 and a first transmitting module 920.

The first receiving module 910 is used for receiving uplink data sent by a terminal at transmitting time.

The first transmitting module 920 is used for transmitting downlink data to the terminal within a time period after the transmitting time and when the terminal is in a Discontinuous Reception (DRX) active period.

Optionally, as an implementation, the apparatus further includes: a first determining module used for determining a first DRX pattern for indicating a time period corresponding to the DRX dormant period and a time period corresponding to the DRX active period within the time period after the transmitting time; and the first transmitting module is further used for transmitting the downlink data to the terminal within a corresponding time period when the terminal is in the DRX active period according to the first DRX pattern, within the time period after the transmitting time.

Optionally, as an implementation, the apparatus further includes: a second transmitting module used for transmitting first indication information to the terminal, wherein the first indication information is used for indicating the first DRX pattern.

Optionally, as an implementation, the apparatus further includes: a third transmitting module used for transmitting a duration of using the first DRX pattern to the terminal; and the first transmitting module is further used for: within the duration, transmitting the downlink data to the terminal within a corresponding time period when the terminal is in the DRX active period according to the first DRX pattern, wherein the duration is the time period after the transmitting time.

Optionally, as an implementation, the apparatus further includes: a fourth transmitting module used for transmitting second indication information to the terminal, wherein the second indication information is used for indicating that the terminal does not switch between the DRX dormant period and the DRX active period according to the first DRX pattern.

Optionally, as an implementation, the apparatus further includes: a fifth transmitting module used for transmitting third indication information to the terminal, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

Optionally, as an implementation, the time period corresponding to the DRX dormant period and the time period corresponding to the DRX active period are determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Optionally, as an implementation, the first transmitting module is further used for transmitting ACK information of the uplink data to the terminal within the time period after the transmitting time and while the terminal is in the DRX active period, wherein the ACK information is carried in the downlink data.

Optionally, as an implementation, the first transmitting module is further specifically used for transmitting NACK information of the uplink data to the terminal within the time period after the transmitting time and while the terminal is in the DRX active period; and receiving the uplink data sent by the terminal again.

Optionally, as an implementation, the first transmitting module is further specifically used for not transmitting ACK information of the uplink data to the terminal during the time period corresponding to the DRX active period within the time period after the transmitting time, and preparing to receive the uplink data transmitted by the terminal.

Optionally, as an implementation, the time period after the transmitting time includes a first time period, starting time of the first time period is the transmitting time, and the terminal is in the DRX active period within the first time period, and the first transmitting module is further specifically used for transmitting the downlink data to the terminal within the first time period.

Optionally, as an implementation, the time period after the transmitting time includes a first time period, starting time of the first time period is the transmitting time, and the terminal is in the DRX dormant period within the first time period, and the first transmitting module is specifically used for transmitting the downlink data to the terminal within the time period after the transmitting time and after the first time period.

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Figure 10:
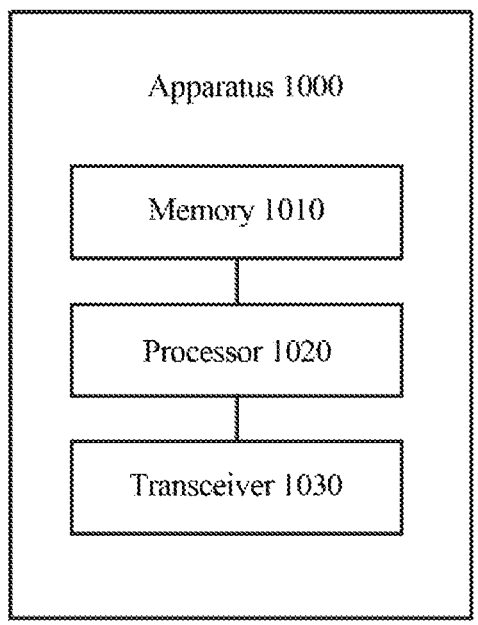
FIG. 10 shows a schematic block diagram of discontinuous reception according to another implementation of the present disclosure.

FIG. 10 shows a schematic block diagram of discontinuous reception according to another implementation of the present disclosure. The apparatus 1000 shown in FIG. 10 includes a memory 1010 for storing programs, a processor 1020 for executing the programs, and a transceiver 1030 for transmitting uplink data to a network device at transmitting time when the programs are executed. The processor 1020 is used for switching between a Discontinuous Reception (DRX) dormant period and a DRX active period within a time period after the transmitting time.

Optionally, as an implementation, the apparatus further includes: a processor 1020 used for determining a first DRX pattern indicating a time period corresponding to the DRX dormant period and a time period corresponding to the DRX active period within the time period after the transmitting time; and the processor 1020 is further used for switching between the DRX dormant period and the DRX active period according to the first DRX pattern within the time period after the transmitting time.

Optionally, as an implementation, the processor 1020 is further used for receiving first indication information sent by the network device, wherein the first indication information is used for indicating the first DRX pattern.

Optionally, as an implementation, the apparatus further includes: a processor 1020 used for determining a duration of using the first DRX pattern; and the processor 1020 is further used for switching between the DRX dormant period and the DRX active period according to the first DRX pattern within the duration, and the duration is the time period after the transmitting time.

Optionally, as an implementation, the apparatus further includes: a processor 1020 used for switching between the DRX dormant period and the DRX active period according to a second DRX pattern after the duration.

Optionally, as an implementation, the apparatus further includes: a transceiver 1030 used for receiving second indication information sent by the network device, wherein the second indication information is used for indicating that the processor 1020 does not switch between the DRX dormant period and the DRX active period according to the first DRX pattern.

Optionally, as an implementation, the apparatus further includes: a processor 1020 used for switching between the DRX dormant period and the DRX active period according to the second DRX pattern.

Optionally, as an implementation, that apparatus further include: a transceiver 1030 used for receiving third indication information sent by the network device, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

Optionally, as an implementation, the time period corresponding to the DRX dormant period and/or the time period corresponding to the DRX active period are determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Optionally, as an implementation, the processor 1020 is specifically used for receiving ACK information of the uplink data sent by the network device within the DRX active period, within the time period after the transmitting time; and switching from the DRX active period to the DRX dormant period at time of receiving the ACK information.

Optionally, as an implementation, the processor 1020 is specifically used for receiving NACK information of the uplink data sent by the network device within the DRX active period within the time period after the transmitting time; and transmitting the uplink data to the network device again.

Optionally, as an implementation, the processor 1020 is specifically used for receiving NACK information of the uplink data sent by the network device within the DRX active period, within the time period after the transmitting time; and switching from the DRX active period to the DRX dormant period at time of receiving the NACK information.

Optionally, as an implementation, the processor 1020 is specifically used for transmitting the uplink data to the network device, when ACK information of the uplink data sent by the network device is not received during the time period corresponding to the DRX active period within the time period after the transmitting time.

Optionally, as an implementation, the time period after the transmitting time includes a first time period, starting time of the first time period is the transmitting time, and the processor 1020 is specifically used for: being in the DRX active period within the first time period; and switching from the DRX active period to the DRX dormant period within the time period after the transmitting time and after the first time period.

Optionally, as an implementation, the time period after the transmitting time includes a first time period, starting time of the first time period is the transmitting time, and the processor 1020 is specifically used for: being in the DRX dormant period within the first time period; and switching from the DRX dormant period to the DRX active period within the time period after the transmitting time and after the first time period.

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Figure 11:
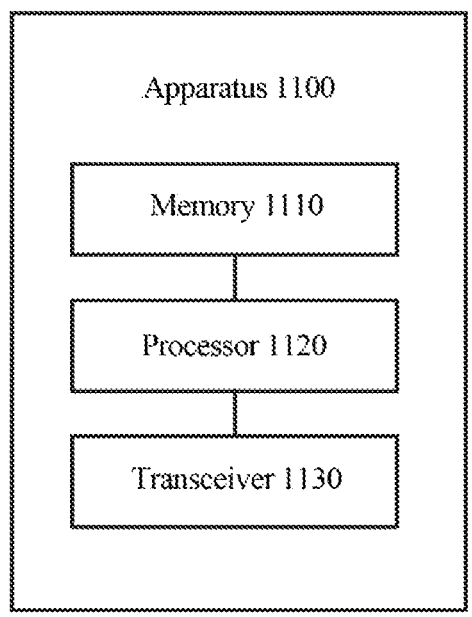
FIG. 11 shows a schematic block diagram of discontinuous reception according to another implementation of the present disclosure.

FIG. 11 shows a schematic block diagram of discontinuous reception according to another implementation of the present disclosure. The apparatus 1100 shown in FIG. 11 includes a memory 1111 for storing programs, a processor 1120 for executing the programs, and a transceiver 1130 for receiving uplink data transmitted by a terminal at transmitting time when the programs are executed. The transceiver 1130 is further used for transmitting downlink data to the terminal within a time period after the transmitting time and when the terminal is in a Discontinuous Reception (DRX) active period.

Optionally, as an implementation, the apparatus further includes: a processor 1120 for determining a first DRX pattern for indicating a time period corresponding to the DRX dormant period and a time period corresponding to the DRX active period within the time period after the transmitting time; and the transceiver 1130 is further used for transmitting the downlink data to the terminal within a corresponding time period when the terminal is in the DRX active period according to the first DRX pattern, within the time period after the transmitting time.

Optionally, as an implementation, the apparatus further includes: a transceiver 1130 used for transmitting first indication information to the terminal, wherein the first indication information is used for indicating the first DRX pattern.

Optionally, as an implementation, the apparatus further includes: a transceiver 1130 used for transmitting a duration of using the first DRX pattern to the terminal; and the transceiver 1130 is further used for: within the duration, transmitting the downlink data to the terminal within a corresponding time period when the terminal is in the DRX active period according to the first DRX pattern, wherein the duration is the time period after the transmitting time.

Optionally, as an implementation, the apparatus further includes: a transceiver 1130 used for transmitting second indication information to the terminal, wherein the second indication information is used for indicating that the terminal does not switch between the DRX dormant period and the DRX active period according to the first DRX pattern.

Optionally, as an implementation, the apparatus further includes: a transceiver 1130 used for transmitting third indication information to the terminal, wherein the third indication information is used for indicating at least one of following pieces of information: information of a service type to which the first DRX pattern is applicable, information of a bearer to which the first DRX pattern is applicable, information of a logical channel to which the first DRX pattern is applicable, and information of an HARQ process to which the first DRX pattern is applicable.

Optionally, as an implementation, the time period corresponding to the DRX dormant period and the time period corresponding to the DRX active period are determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

Optionally, as an implementation, the transceiver 1130 is further specifically used for transmitting ACK information of the uplink data to the terminal within the time period after the transmitting time and while the terminal is in the DRX active period, and the ACK information is carried in the downlink data.

Optionally, as an implementation, the transceiver 1130 is further specifically used for transmitting NACK information of the uplink data to the terminal within the time period after the transmitting time and while the terminal is in the DRX active period; and receiving the uplink data sent by the terminal again.

Optionally, as an implementation, the transceiver 1130 is further specifically used for not transmitting ACK information of the uplink data to the terminal within the time period after the transmitting time and after the time period corresponding to the DRX active period, and preparing to receive the uplink data transmitted by the terminal.

Optionally, as an implementation, the time period after the transmitting time includes a first time period, and starting time of the first time period is the transmitting time, and the terminal is in the DRX active period within the first time period, and the transceiver 1130 is specifically used for transmitting the downlink data to the terminal within the first time period.

Optionally, as an implementation, the time period after the transmitting time includes a first time period, and starting time of the first time period is the transmitting time, and the terminal is in the DRX dormant period within the first time period, and the transceiver 1130 is specifically used for transmitting the downlink data to the terminal within the time period after the transmitting time and after the first time period.

Optionally, as an implementation, the first time period is determined according to at least one of the following pieces of information: a service quality or service attribute corresponding to downlink data to be transmitted; time required for encoding uplink data and/or downlink data; time required for decoding uplink data and/or downlink data; and transmission time required to transmit uplink data and/or downlink data.

It should be understood that in an implementation of the present disclosure, "B corresponding to A" means that B is associated with A, and B may be determined according to A. However, it should be further understood that determining B according to A does not mean B is determined according to A only, but B may be determined according to A and/or other information.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

It should be understood that in various implementations of the present disclosure, the values of the sequence numbers in the above-mentioned processes do not indicate the order of execution, and the order of execution of various processes should be determined by its function and internal logic, and should not constitute any limitation on the implementation process of the implementations of the present disclosure.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various functional units may be physically present separately, or two or more units may be integrated in one unit.

The functions may be stored in a computer readable storage medium if implemented in the form of software functional units and sold or used as a separate product. Based on this understanding, the technical solution of the present disclosure, in essence, or the part contributing to the prior art, or the part of the technical solution, may be embodied in the form of a computer software product stored in a storage medium, including a number of instructions for causing a computer device (which may be a personal computer, a server, or a network device) to perform all or part of the acts of the method described in various implementations of the present disclosure. The aforementioned storage medium includes U disk, mobile hard disk, read-only memory (ROM), random access memory (RAM), magnetic disk or optical disk, and other medium capable of storing program codes.

I claim:

1. A method for discontinuous reception, comprising:
    transmitting, by a terminal, uplink data to a network device at transmitting time; and
    receiving, by the terminal, at least one of first indication information, second indication information, or third indication information from the network device,
    wherein the first indication information is used for indicating a first discontinuous Reception (DRX) pattern,
    wherein the second indication information is used for indicating that the terminal does not switch between a DRX dormant period and a DRX active period according to the first DRX pattern, and
    wherein the third indication information is used for indicating at least one of:
        information of a service type to which the first DRX pattern is applicable,
        information of a bearer to which the first DRX pattern is applicable,
        information of a logical channel to which the first DRX pattern is applicable, or
        information of an HARQ process to which the first DRX pattern is applicable;
    wherein when the first indication information is received by the terminal, determining, by the terminal, the first DRX pattern according to the first indication information and switching, by the terminal, between the DRX dormant period and the DRX active period according to the first DRX pattern within a time period after the transmitting time; and
    wherein when the second indication information is received by the terminal, stopping, by the terminal, the switching between the DRX dormant period and the DRX active period according to the first DRX pattern.

2. The method of claim 1, wherein the method further comprises:
    determining, by the terminal, a duration of using the first DRX pattern; and
    switching, by the terminal, between the DRX dormant period and the DRX active period according to the first DRX pattern within the time period after the transmitting time, comprises:
    within the duration, switching, by the terminal, between the DRX dormant period and the DRX active period according to the first DRX pattern, and the duration is the time period after the transmitting time.

3. The method of claim 2, wherein the method further comprises:
    switching, by the terminal, between the DRX dormant period and the DRX active period according to a second DRX pattern after the duration.

4. The method of claim 1, wherein the method further comprises:
before the terminal determines the first DRX pattern, switching, by the terminal, between the DRX dormant period and the DRX active period according to a second DRX pattern.

5. The method of claim 1, wherein the time period corresponding to the DRX dormant period or the time period corresponding to the DRX active period is determined according to at least one of following pieces of information:
a service quality or service attribute corresponding to downlink data to be transmitted;
time required for encoding uplink data or the downlink data;
time required for decoding the uplink data or the downlink data; or
transmission time required to transmit the uplink data or the downlink data.

6. The method of claim 1, wherein switching, by the terminal, between the DRX dormant period and the DRX active period within the time period after the transmitting time, comprises:
receiving, by the terminal, ACK information of the uplink data sent by the network device within the DRX active period, within the time period after the transmitting time; and
switching, by the terminal, from the DRX active period to the DRX dormant period at time of receiving the ACK information,
or,
the switching, by the terminal, between the DRX dormant period and the DRX active period within the time period after the transmitting time, comprises:
receiving, by the terminal, NACK information of the uplink data sent by the network device within the DRX active period, within the time period after the transmitting time; and
switching, by the terminal, from the DRX active period to the DRX dormant period at time of receiving the NACK information.

7. The method of claim 1, wherein the method further comprises:
receiving, by the terminal, NACK information of the uplink data sent by the network device within the DRX active period, within the time period after the transmitting time; and
retransmitting, by the terminal, the uplink data to the network device,
or,
the method further comprises:
transmitting, by the terminal, the uplink data to the network device, when the terminal does not receive ACK information of the uplink data sent by the network device during the time period corresponding to the DRX active period within the time period after the transmitting time.

8. The method of claim 1, wherein the time period after the transmitting time comprises a first time period, starting time of the first time period is the transmitting time, and switching, by the terminal, between the DRX dormant period and the DRX active period within the time period after the transmitting time, comprises:
switching, by the terminal, from the DRX active period to the DRX dormant period after the first time period within the time period after the transmitting time, the terminal being in the DRX active period within the first time period;
or,
the time period after the transmitting time comprises a first time period, starting time of the first time period is the transmitting time, and switching, by the terminal, between the DRX dormant period and the DRX active period within the time period after the transmitting time, comprises:
switching, by the terminal, from the DRX dormant period to the DRX active period after the first time period within the time period after the transmitting time, the terminal being in the DRX dormant period within the first time period.

9. The method of claim 8, wherein the first time period is determined according to at least one of:
a service quality or service attribute corresponding to downlink data to be transmitted;
time required for encoding uplink data or the downlink data;
time required for decoding the uplink data or the downlink data; or
transmission time required to transmit the uplink data or the downlink data.

10. An apparatus for discontinuous reception, comprising a processor and a transceiver,
wherein the transceiver is used for transmitting uplink data to a network device at transmitting time and receiving at least one of first indication information, second indication information, or third indication information,
wherein the first indication information is used for indicating a first discontinuous Reception (DRX) pattern,
wherein the second indication information is used for indicating that the terminal does not switch between a DRX dormant period and a DRX active period according to the first DRX pattern,
wherein the third indication information is used for indicating at least one of:
information of a service type to which the first DRX pattern is applicable,
information of a bearer to which the first DRX pattern is applicable,
information of a logical channel to which the first DRX pattern is applicable, or
information of an HARQ process to which the first DRX pattern is applicable,
wherein when the first indication information is received by the transceiver, the processor is used for determining the first DRX pattern according to the first indication information and switching between the dormant period and the DRX active period according to the first DRX pattern within a time period after the transmitting time, and
wherein when the second indication information is received by the transceiver, the processor is used for stopping the switching between the DRX dormant period and the DRX active period according to the first DRX pattern.

11. The apparatus of claim 10, wherein the processor is further used for:
determining a duration of using the first DRX pattern; and
switching between the DRX dormant period and the DRX active period according to the first DRX pattern within the duration, wherein the duration is the time period after the transmitting time.

12. The apparatus of claim 11, wherein the processor is further used for:
switching between the DRX dormant period and the DRX active period according to a second DRX pattern after the duration.

13. The apparatus claim 10, wherein the time period corresponding to the DRX dormant period or the time period corresponding to the DRX active period is determined according to at least one of:

a service quality or service attribute corresponding to downlink data to be transmitted;

time required for encoding uplink data or the downlink data;

time required for decoding the uplink data or the downlink data; or transmission time required to transmit the uplink data or the downlink data.

14. The apparatus of claim 10, wherein the time period after the transmitting time comprises a first time period, starting time of the first time period is the transmitting time, and the processor is specifically used for:

being in the DRX active period within the first time period; and switching from the DRX active period to the DRX dormant period after the first time period within the time period after the transmitting time, or, the processor is specifically used for:

being in the DRX dormant period within the first time period; and switching from the DRX dormant period to the DRX active period after the first time period within the time period after the transmitting time.

15. The apparatus of claim 14, wherein the first time period is determined according to at least one of:

a service quality or service attribute corresponding to downlink data to be transmitted;

time required for encoding uplink data or the downlink data;

time required for decoding the uplink data or the downlink data; or transmission time required to transmit the uplink data or the downlink data.

16. A non-transitory computer readable medium, which stores program codes for execution, wherein the program codes include instructions for executing the method of claim 1.

* * * * *